United States Patent [19]

Croxon

[11] 3,757,310

[45] Sept. 4, 1973

[54] MEMORY ADDRESS SELECTION APPARATUS INCLUDING ISOLATION CIRCUITS

[75] Inventor: Brian F. Croxon, Peabody, Essex County, Mass.

[73] Assignee: Honeywell Information Systems, Inc., Waltham, Mass.

[22] Filed: Jan. 3, 1972

[21] Appl. No.: 214,771

[52] U.S. Cl. ........... 340/172.5, 340/173 R, 307/238

[51] Int. Cl. ......................... G11c 11/40, G06f 3/00

[58] Field of Search ..................... 340/173 R, 172.5; 307/238

[56] References Cited

UNITED STATES PATENTS

| | | | |
|---|---|---|---|
| 3,641,511 | 2/1972 | Cricchi et al. | 340/173 R |
| 3,576,548 | 4/1971 | Watson | 340/173 R |
| 3,624,620 | 11/1971 | Andrews | 340/173 R |
| 3,685,027 | 8/1972 | Allen et al. | 340/173 R |
| 3,614,749 | 10/1971 | Radcliffe | 340/173 R |
| 3,588,848 | 6/1971 | Van Beek | 340/173 |

*Primary Examiner*—Paul J. Henon
*Assistant Examiner*—Mark Edward Nusbaum
*Attorney*—Faith F. Driscoll et al.

[57] ABSTRACT

A semiconductor memory chip includes buffer circuits positioned between the input address lines applied to the chip and the decoder circuits coupled to the cells of the memory array. Each of the buffer circuits is arranged to translate low level logic address signals applied to its input terminal into a pair of high level complementary signals suitable for driving a pair of address selection lines applied to the input terminals of the decoder circuits. During a first interval of a memory cycle prior to address selection time, each buffer circuit is forced to a predetermined state. This forces each pair of address selection lines to a first state selected to enable each of the decoder circuits to be precharged to a first predetermined state during the first interval. Subsequently, during address selection time, a clocking signal conditions each of the buffer circuits to switch only one address selection line of each pair of lines from a first state to a second state in accordance with the state of the low level address information signal applied to its input terminal. This causes each of the decoder circuits which has one of its input terminals forced to a second state to discharge rapidly from the first predetermined state to a second predetermined state with only the addressed decoder circuits remaining at the first predetermined state.

24 Claims, 4 Drawing Figures

MEMORY ADDRESS SELECTION APPARATUS INCLUDING ISOLATION CIRCUITS

BACKGROUND OF THE INVENTION

1. Field of Use

This invention relates to semiconductor memory storage systems and more particularly to address and selection apparatus used to select locations within the memory in response to address signals.

2. Prior Art

In general, in order for semiconductor memory systems to be reliable, these systems must include apparatus which guarantees the selection of only a single memory location or group of memory cells in response to address and select information. It will be appreciated that selection apparatus which can give rise to multiple address selection or chip selection within a semiconductor memory system can destroy data stored at one or more locations. That is, the selection of more than one cell within a memory location can produce an output in the form of a voltage or current which causes memory sense circuits to incorrectly interpret the information content stored at the location addressed.

In order to avoid the above problems, some prior art systems provide apparatus for delaying the presenting of successive address signals to the memory until sufficient time has passed for all transient signals to subside such that information at a single location can be accurately referenced. The primary disadvantage with these systems is the inherent delays associated therewith and corresponding lengthening of memory access time.

Other prior art semiconductor systems provide apparatus external to the system to generate pairs of high level complementary address signals and chip select signals by the decoding apparatus included within the system. Such systems are not absolute in that delays between any one of these signals can result in the selection of more than one address or more than one chip.

Still other prior art semiconductor systems include apparatus in the form of clocked inverter circuits within the chip which are operative to invert the high level input address signals applied to the chip to produce the pairs of high level complementary signals required. Again, these systems are also not absolute in that any variations occurring in the delay time between the input signal and its complement can result in the selection of more than one address. Further, this arrangement can lengthen the time during which the input address signal cannot change state in order to provide for sufficient time for generating the complementary signals. Moreover, these systems still require high level input signals and therefore are not directly compatible with the low level signals provided by the data processing circuits associated with the memory.

Here again, any variations in delay between the two signals can result in unreliable address selection and lengthen considerably the time during which the input address signal is not permitted to change state.

Accordingly, it is a primary object of the present invention to provide an improved address and selection apparatus.

It is a further object of the present invention to provide a high speed clocked buffer circuit for use with decoder selection circuits of a MOS semiconductor memory system.

It is a more specific object of the present invention to provide an input translation circuit for use in a field effect transistor semiconductor memory system which ensures reliable address selection and is directly compatible with low level transistor transistor logic circuit levels.

It is still a more specific object of the present invention to provide buffer apparatus for use with selection circuit apparatus and which generates pairs of complementary output signals in accordance with address input signals so that a change in state in the output signals of each of the circuits occurs simultaneously.

It is still a further more specific object of the present invention to provide a buffer circuit which converts low level input signals applied thereto into high level output signals suitable for driving a high capacitance load.

SUMMARY OF THE INVENTION

The foregoing objects are achieved in a preferred embodiment of the present invention comprising address and selection apparatus which includes a plurality of buffer circuits, each of which receives a different one of a plurality of low level signals and translates it into pairs of high level complementary output signals for driving the lines coupled to a plurality of field effect transistor circuits within a semiconductor memory system.

Each buffer circuit includes an input logic section coupled to an input terminal and a driver section coupled to a pair of output lines. The input logic section clocked input gating circuits include MOS devices whose width to length ratios are adjusted to sample a low level input address signal and thereafter selectively enable one of a pair of MOS transistor driver circuits included within the driver section in accordance with the sampled signal. More particularly, during a first predetermined interval of a memory cycle defined by a first clocking signal, circuits precharge a bootstrapping capacitor individually coupled to each driver circuit and the parasitic or node capacitance associated therewith to a predetermined voltage level. This conditions the pair of driver circuits of each buffer circuit to apply predetermined voltage levels to its respective pair of output lines. The outputs of the address buffer circuits are coupled as inputs to the decoder circuits. The predetermined levels are selected so as not to affect the operation of the decoder circuit by enabling them to be charged to a predetermined state during the first interval so as to charge the capacitances associated with their respective selection lines to the same state.

The input gating circuits of each buffer circuit is arranged to sample the state of the input address signal during the first interval and thereafter selectively discharges the capacitances of one of the driver circuits in accordance with such sampling in response to a second clocking signal rendering certain ones of the driver transistors nonconductive. This in turn causes only the appropriate ones of the driver transistors to be conductive. This results in only one of the pair of output lines being forced from the predetermined voltage level to another voltage level in response to a further clocking signal which overlaps the second clocking signal.

Accordingly, upon the occurrence of the further clocking signal only one of the driver circuits of each buffer circuit switches its respective output line from the predetermined voltage level to another voltage level in accordance with the states of the node capacitances. The change in levels produced by the buffer circuits cause all of the decoder circuits except the decoder circuit whose input lines remain at the predetermined voltage level to switch the state of their respective selection lines so as to rapidly discharge the capacitances associated therewith. By having the decoder circuits charge the normally larger capacitances associated with the selection lines during the first interval, and thereafter discharge rapidly all of the decoder circuits except the one selected, the overall response time of the selection apparatus is enhanced.

It will be further noted that the arrangement of the invention avoids the possibilities of multiple selection signals by arranging each of the buffer circuits to switch both the output lines to a predetermined voltage level prior to the time at which selection can take place, and thereafter causing the buffer circuit to force only one output line to an alternate voltage level in accordance with the sampled state of their respective address signals in response to a common clocking signal.

In accordance with the preferred embodiment of the invention, each of the transistor driver circuits includes a pair of field effect transistors arranged in a push-pull arrangement. The bootstrapping capacitor of each of the driver circuits, coupled between the gate and output electrodes of one of the pair of driver output transistors, feeds back the output voltage of the driver circuit to its respective output transistor. Each of the capacitors are initially charged approximately to the level of the common clocking signal during the first interval of each memory cycle. Accordingly, upon the occurrence of the common clocking signal, the change in voltage applied to a selected one of the output lines by the conductive driver transistor is fed back through the bootstrapping capacitor to the gate electrodes conditioning the driver transistor to increase the voltage level on its gate electrode in proportion to the charge on the bootstrapping capacitor until the threshold of the driver transistor is exceeded.

The above arrangement results in producing an output voltage level which approximates that of the common clocking signal applied to the conductive driver transistor. Accordingly, the high levels output signals provided by the buffer circuit are not reduced as a result of the threshold voltages of the MOS transistors involved. Further, the arrangement also decreases the turn on time of the one transistor of the driver section conditioned to switch the state of its output line thereby enhancing the speed of the buffer circuit.

A further feature of the buffer circuit of the present invention is its low power dissipation which results from charging the driver section capacitances through a single direct current path only during the time interval defined by the first clocking signal and discharging one of the capacitances selectively in accordance with the input address information. Accordingly, with minimum power consumption afforded by the invention, greater density of cells and associated circuitry on the semiconductor chip can be realized.

The above and other objects of this invention are achieved in an illustrative embodiment described hereinafter. The novel features which are believed to be characteristic of the invention both as to its organization and method of operation, together with further objects and advantages thereof will be better understood from the following description considered in connection with the accompanying drawings. It is to be expressly understood, how-ever, that these drawings are intended for the purpose of illustration and description only and are not intended as a definition of the limits of the present invention.

DESCRIPTION OF THE PREFERRED EMBODIMENT

Figure 1:
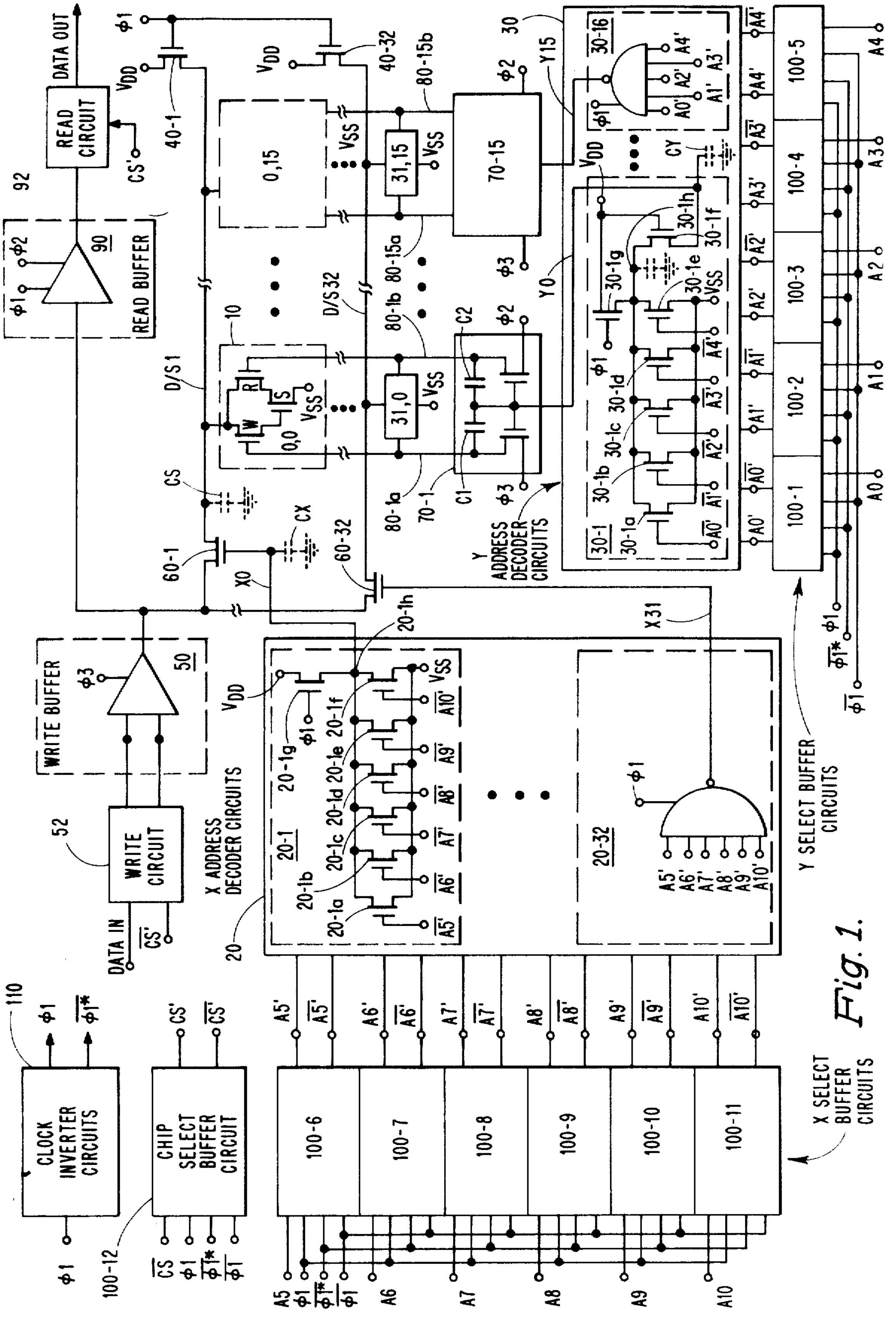
FIG. 1 shows in block diagram form a MOS semiconductor memory chip which employs the address and selection apparatus and the buffer circuit of the present invention.

FIG. 1 illustrates a MOS semiconductor memory chip which utilizes the present invention. It is seen from FIG. 1 that all active devices within the system are constructed of metal oxide semiconductor (MOS) field effect transistors or devices. As well known in the art, the MOS devices are fabricated on a single P or N type silicon substrate with each of the MOS devices having a gate or control region, a drain region and a source region herein referred to as gate (control), drain and source electrodes. For the purposes of the present invention, the source and drain electrodes can be regarded as being interchangeable.

In the embodiment shown, these devices are insulated gate P channel enhancement type field effect transistors. The enhancement type MOS device has been selected primarily for minimizing power in that the conductivity through the conduction path of the device is characteristically low and hence only a small leakage current flows between the source and drain regions when the gate and source electrodes are at the voltage.

In the present invention, internal to the system, a voltage level representative of a binary ONE and a binary ZERO respectively corresponds to the drain supply of −15 volts and the source supply voltage VSS of +5 volts. Considering the operation of the P channel MOS transistor briefly, it will be noted that the majority carriers or holes flow from the source to drain electrodes (i.e., has a high conductivity conduction path) when the voltage applied to the gate electrode of the MOS device is negative relative to the voltage applied to the source electrode (i.e., a binary ONE). Conversely, when the voltage applied to the gate electrode of the P channel MOS device is negative relative to the voltage applied to the source electrode by an amount less than the threshold voltage of the device (i.e., voltage between gate and source electrodes) then the device is nonconductive as in the instance of a binary ZERO being applied thereto. As well known to those skilled in the art, the threshold voltage normally corresponds to a voltage between 1.5 and 2.5 volts. It will be appreciated that this description is also indicative of the operation of N channel MOS devices using opposite polarity voltages.

As shown, the memory chip includes a plurality of three transistor MOS memory cells 10 which are arranged in rows and columns to form an array. More particularly, in the illustrated embodiment each cell is of the dynamic type which as shown includes three transistors, an input transistor, an output transistor and a storage transistor. The input and output transistors of each cell isolate the "storage" transistor from the digit/sense line or I/O bus that connects the input/output terminals of the cells of each row of the memory array. The input transistor or "write" transistor is operative to control the placement of a charge across the gate to substrate or gate to source capacitance (termed herein storage node) of the storage transistor during a write cycle. The output or "read" transistor connects in series with the storage transistor for sensing the stored charge of the storage node or parasitic capacitor of the storage transistor during a read cycle.

The memory chip 100 of FIG. 1 also is seen to include a plurality of row address decoder selection circuits 20–1 through 20–31 and a plurality of column address decoder selection circuits 30–1 through 30–15 which together are operative in response to combinations of binary address signals to select a particular one of a plurality of X conductors and a particular one of a plurality of Y conductors, thereby defining which one of the plurality of memory cells 10 information is to be written into or read from.

It will be appreciated from the arrangement shown that the actual cell selection is accomplished through the application of clocking signals designated $\phi 1$, $\phi 2$, and $\phi 3$. These signals may be generated by conventional three phase clocking circuits located external to the chip.

The clocking signal $\phi 1$ is applied to the control electrodes of the MOS transistors 40-1 through 40-31 rendering them conductive so as to precharge the capacitance CS of each of the input/output lines designated as digit/sense lines D/S1 through D/S31 to a predetermined value during this interval. During an interval defined by clocking signal $\phi 2$, the Y address decoder selection circuit 30 conditions one of a selected pair of transistor circuits 70-1 through 70-15 to apply a voltage along one of the conductors **80-1*b* through 80-15*b* thereby defining which MOS memory cell of the array is to have its contents read out to a read buffer circuit 90, and thence to a read circuit 92 via a common digit/sense line 85. Both of the circuits 90 and 92** may be assumed as being conventional in design.

During an interval defined by clocking signal $\phi 3$ of the same memory cycle, the Y address decoder selection circuit 30 conditions the other one of the selected pair of transistor circuits 70-1 through 70-15 to apply a voltage along one of the conductors **80-1*a* through 80-15*b* thereby defining which MOS memory cell is to have the information from a line DATA IN applied to the common digit/sense line 85 via a write circuit 52 and a write buffer circuit 50 written therein. Both the circuits 50 and 52** may be assumed to be conventional in design.

As seen from FIG. 1, the X address decoder circuits 20 and Y address decoder circuits 30 receive different combinations of pairs of complementary address signals from a plurality of buffer circuits 100-1 through 100-10, each of which comprise the circuits disclosed in FIG. **1*a*. The buffer circuits 100-1 through 100-5** generate the pairs of high level complementary address signals A*o*′, $\overline{Ao}$′ through A4′, $\overline{A4}$′ in accordance with the state of the low order bits of the address defining information A*o* through A4 applied at their respective inputs. The remaining pairs of complementary address signals designated as A5′, $\overline{A5}$′ through A10′, A10′ are generated by the buffer circuits 100-6 through 100-11 in accordance with address signals A5 through A10.

Additionally, each of the buffer circuits 100-1 through 100-11 receives clocking signals designated as $\phi 1$, $\overline{\phi 1}$, and $\overline{\phi 1}^*$. These signals are produced by clocking circuits included within block 110 which are disclosed in greater detail in FIG. 1*b*. A further chip select buffer circuit 100-12 receives a chip select input signal $\overline{CS}$ in addition to the clocking signals $\phi 1$, $\overline{\phi 1}$, and $\overline{\phi 1}^*$. The chip select buffer circuit 100-12 is operative to produce a pair of complementary select signal levels designated in FIG. 1 as CS′ and $\overline{CS}$′ in accordance with the state of input signal $\overline{CS}$. As shown, these signals are applied to the Write Circuit 52 and Read Circuit 92 to enable them to perform their respective operations during each write cycle and read cycle of operation.

Before describing the selection apparatus and the buffer circuit in greater detail, reference is first made to FIG. **1*b***. This figure shows the circuits which are operative to generate clocking signals $\overline{\phi 1}^*$ and $\overline{\phi 1}$ in response to the clocking signal $\phi 1$. The relationship between the two clocking signals are such that clocking signals $\overline{\phi 1}^*$ overlaps in time clocking signal $\overline{\phi 1}$. This arrangement is used to obviate any possibility of a race condition between certain circuit portions of the buffer circuit 100.

Figure 1B:
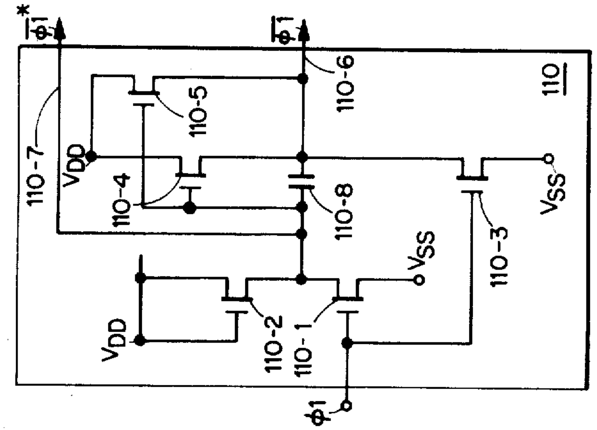
FIG. 1*b* shows in greater detail the inverter circuits used to produce clocking signals used in connection with the buffer circuit of FIG. 1*a*; and, FIG. 2 shows waveforms used in describing the operation of the present invention in connection with FIG. 1.

CLOCKING CIRCUITS OF FIG. 1*b*

From FIG. 1b, it is seen that the clocking circuits 110 include a pair of MOS transistors 110-1 and 110-2 arranged to operate as a first inverter stage. As shown, the clocking circuits 110 further include MOS transistors 110-3, 110-4 and 110-5 arranged as shown to delay the input signal $\overline{\phi 1}^*$ by a predetermined amount. In particular, the value of capacitance of a capacitor 110-8 which connects between the gate and source electrodes of transistors 110-4 and 110-5 is selected to provide the desired rise time for clocking signal $\overline{\phi 1}$. The transistors 110-4 and 110-5 which connect in a "totem pole" or push-pull arrangement with MOS transistor 110-5 are arranged to have their width to length ratios selected to provide sufficient driving current to a high capacitance load coupled to an output line 110-6. In the preferred embodiment, transistors 110-3 through 110-5 are selected to have ratios of 80/1.

It will be noted from FIG. 1b that MOS transistor 110-2 is normally conductive as a result of its drain and gate electrodes being connected to a voltage supply VDD and that the capacitor 110-8 is charged negatively through transistor 110-2. Accordingly, the source electrode of transistor 110-2 is at a negative voltage level which is one threshold drop lower than the supply voltage VDD. Therefore, in the absence of an input signal to the gate or control electrode of transistor 110-1 (i.e., $\phi 1$ is a binary ZERO), the gate electrodes of transistors 110-4 and 110-5 are at a voltage more negative than that value of voltage applied to their source electrodes. Therefore, both transistors 110-4 and 110-5 are conductive. Also, during this time, transistors 110-1 and 110-3 are nonconductive. Therefore, both lines 110-6 and 110-7 are at a voltage level representative of a binary ONE. When the clocking signal $\phi 1$ switches from a binary ZERO to a binary ONE, it switches transistors 110-1 and 110-3 into conduction and line 110-7 is forced from a binary ONE to a positive voltage level VSS representative of a binary ZERO.

Since switching of transistor 110-1 occurs rapidly, the change of state of output signal $\overline{\phi 1}$* occurs rapidly.

When line 110-7 is forced to a ZERO, the control electrodes of transistors 110-4 and 110-5 are conditioned to switch their respective transistors to a nonconductive state. However, due to the precharging of capacitor 110-8 to a negative voltage, the switching of transistors 110-4 and 110-5 from a conductive to a nonconductive state is delayed for a short interval of time following the switching of transistor 110-3. Accordingly, line 110-6 is forced from a binary ONE to a binary ZERO state after the line 110-7 switches from a binary ONE to to a binary ZERO state. That is, clocking signal $\overline{\phi 1}$ switches from a binary ONE to a binary ZERO state after clocking signal $\overline{\phi 1}$* switches from a binary ONE to a binary ZERO. When the clocking signal $\phi 1$ switches from a binary ONE to a binary ZERO, the transistors of block 110 switch back to their initial states in the same time sequence described above. That is, line 100-6 is forced from a binary ZERO to a binary ONE state after line 110-7 switches from a binary ZERO to a binary ONE

Figure 1A:
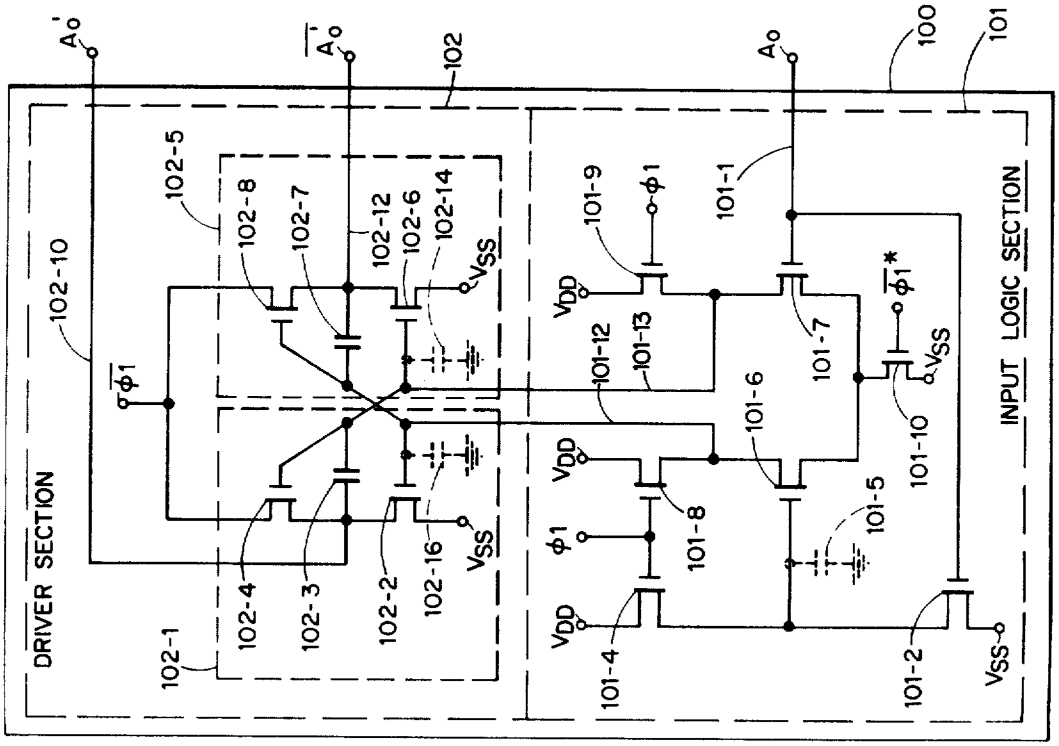
FIG. 1a shows in greater detail the buffer circuit of the present invention.

BUFFER CIRCUIT OF FIG. 1*a*

Referring now to FIG. 1*a*, it is seen that the buffer circuit 100 of the present invention includes an Input Logic section 101 and a Driver section 102. The Input Logic section 101 includes first and second MOS transistors 101-7 and 101-6 which have their source electrodes connected in common to a drain electrode of a clocked current source including a high gain transistor 101-10. As shown, transistor 101-10 has its source electrode connected to a supply voltage VSS and is rendered conductive when the clocking signal $\overline{\phi 1}$* applied to its control electrode is forced from a binary ZERO to a binary ONE.

The MOS transistors 101-6 and 101-7 are arranged to be switched into conduction in accordance with the state of an address input signal applied to the line 101-1. Specifically, the width to length ratios (i.e., gate to source dimension versus drain to source dimension) of MOS transistors 101-4 and 101-2 are adjusted such that when the input address signal A*o*, is a binary ONE (e.g. +3 volts), the effective node capacitance (i.e., gate to substrate capacitance) of transistor 101-6 represented by capacitor 101-5 is charged negatively to approximately a binary ONE (i.e., −15 volts) by the supply voltage VDD via a path established through the drain and source electrodes of a transistor 101-4 when the clocking signal $\phi 1$ applied to its gate electrode is forced to a ONE. Further, in accordance with such ratio adjustment, the node capacitance of the transistor 101-6 is discharged to approximately a binary ZERO (i.e., +5 volts) by the supply voltage VSS via a path established through the drain and source electrodes of the transistor 101-2 when the address signal A*o* is a binary ZERO (e.g. 0 volts) notwithstanding the conduction of transistor 101-4. For example, to provide the foregoing results in the preferred embodiment, the width to length ratios for transistors 101-4 and 101-2 of 10/30 and 200/10 respectively were selected. Of course, it will be appreciated that these values are given by way of example only and should not be constructed as a limitation of the present invention.

The drain electrodes of each of the transistors 101-6 and 101-7 are directly coupled through transistors 101-8 and 101-9 respectively to the supply voltage VDD. The source electrodes of the transistors 101-8 and 101-9 connect to output lines 101-12 and 101-13 respectively as shown. When the clocking signal $\phi 1$ applied to the control electrodes of the transistors 101-8 and 101-9 is forced to a ONE, these transistors apply current to lines 101-12 and 101-13 respectively to charge negatively the effective node capacitances of each of the pairs of Driver Section transistors 102-2, 102-8 and 102-6, 102-4 represented by the capacitors 102-16 and 102-14 respectively. Additionally, the transistors 101-8 and 101-9 respectively charge negatively each of the boot-strapping capacitors 102-7 and 102-3.

It will be noted that as used herein the term "charging" means that the node capacitance or capacitors are charged to a voltage level whose maximum value corresponds to supply voltage VDD. Conversely, the term "discharging" refers to discharging a node capacitance or capacitors to a voltage level whose maximum value approximates the supply voltage VSS.

As seen from FIG. 1*a*, basically, the Driver section 102 comprises a pair of driver circutis 102-1 and 102-5 each connected in a "totem pole" or push-pull configuration. In particular, the driver circuit 102-1 includes series connected MOS transistors 102-2 and 102-4 and bootstrapping capacitor 102-3 coupled between the gate and source electrodes of transistor 102-4 as shown. Similarly, the driver circuit 102-5 includes series connected MOS transistors 102-6 and 102-8 and bootstrapping capacitor 102-7 coupled between the gate and source electrodes of transistor 102-2 as shown. The upper transistors 102-4 and 102-8 of the driver pairs connect in series with a clocked supply voltage $\overline{\phi 1}$ and to a different one of the lines 102-10 and 102-12. The lower MOS transistors 102-2 and 102-6 of the driver circuits connect between the VSS and different ones of the lines 102-10 and 102-12 as shown. The gate electrodes of the transistors 102-4 and 102-8 of the driver circuit 102-1 are coupled to the gate electrodes of transistors 102-6 and 102-2 of the other driver circuit 102-5 and are rendered conductive when capacitors 102-14 and 102-16 are charged negatively causing appropriate output signals designated as A*o*′ and $\overline{Ao}$′ to be applied to lines 102-10 and 102-12 respectively.

The width to length ratios of transistors 102-4 and 102-8 are adjusted to provide a fast response time when one of these transistors switches the state of either line 102-10 or 102-12 from a binary ZERO to a binary ONE. Also, the ratios of transistors 102-2 and 102-1 are adjusted to enable discharging of lines 102-10 and 102-12 within a specified period of time. For example, in the preferred embodiment, the ratio of both transistors 102-4 and 102-8 is 8/1 while the ratio for transistors 102-2 and 102-6 is 2/1.

OPERATION OF THE BUFFER CIRCUIT 100

In general, the buffer circuit 100 is operative to translate the low level address signals applied to its input terminal into higher level signals suitable for driving the MOS transistor devices included within the memory chip of FIG. 1. During the time interval defined by clocking signal $\phi 1$, (i.e., when signal $\phi 1$ is a binary ONE) the precharging MOS transistors 101-8 and 101-9 are conditioned by signal $\phi 1$ to charge negatively the node capacitance of transistors 102-2 and 102-6 corresponding to capacitors 102-16 and 102-14 respectively. Also, during this interval, these transistors charge bootstrapping capacitors 102-3 and 102-7 negatively to approximately a binary ONE (i.e., 12 volts) which corresponds to the difference in the voltage levels applied to lines 101-12 and 101-13 and the voltage levels applied to lines 102-10 and 102-12.

The voltage levels of lines 102-10 and 102-12 approximate the voltage VSS. That is, when each of the capacitors 102-16 and 102-14 are charged sufficiently negative to overcome the threshold voltage of the transistors 102-2, 102-4, 102-6 and 102-8, each transistor switches into conduction. This causes each of the output lines 102-10 and 102-12 to be at a binary ZERO (i.e., voltage VSS) since during this interval the clocking $\overline{\phi 1}$ switches to a binary ZERO for a period of time to discharge the capacitances associated with lines 102-10 and 102-11 to the voltage VSS. Therefore, while transistors 102-4 and 102-8 may charge the capacitances of lines 102-10 and 102-11 for a short period of time during an initial portion of the time interval defined by clocking signal $\phi 1$ (i.e., when signal $\overline{\phi 1}$ is a ONE), the remaining portion of this time interval (i.e., when time clocking signal $\overline{\phi 1}$ is a ZERO) is sufficient in duration to enable transistors 102-2 and 102-6 to discharge these capacitances to the voltage VSS.

The voltage level of lines 102-10 and 102-12 is defined by the differences in the values of capacitance of the bootstrapping capacitors 102-3 and 102-7 and the node capacitors 102-16 and 102-14 which divide the voltage level of approximately −12 volts (i.e., VDD minus the threshold drops of transistors 101-8 and 101-9) applied to lines 101-12 and 101-13 in accordance with their ratios. As explained herein, the value of capacitance for each bootstrapping capacitor is selected relative to the value of node capacitance so that the voltage level applied to lines 101-12 and 101-13 approximates −7 volts which provides the aforementioned difference of −12 volts.

Accordingly during the interval defined by clocking signal $\phi 1$, node capacitors 102-14 and 102-16 will have been charged to a negative voltage which is given in accordance with the values of their capacitance and approximates the value of −7 volts. Similarly, the node capacitor 101-5 will have been conditionally charged to approximately a value of negative voltage corresponding to the voltage VDD in accordance with the state of the input signal A*o*.

At the termination of clocking signal $\phi 1$, the clocking signal $\overline{\phi 1}$* is forced from a binary ZERO to a voltage level representative of a binary ONE. At this time, transistor 101-10 switches from a non-conductive state to a conductive state. The state of the input signal applied to line 101-1 sampled by the capacitor 101-5 then causes a predetermined one of the transistors 101-6 and 101-7 to be switched from a nonconductive state to a conductive state.

Considering the above in greater detail, it is seen that when the input signal A*o* is a binary ONE (i.e., +3 volts), transistor 101-2 is held nonconductive which allows node capacitor 101-5 to be charged negatively to a ONE by transistor 101-4. Therefore, transistor 101-6 becomes conductive while transistor 101-7 remains nonconductive when transistor 101-10 is switched into conduction by signal $\overline{\phi 1}$*. Accordingly, during the interval when signal $\overline{\phi 1}$* is a ONE, transistors 101-6 and 101-10 provide a path for discharging node capacitor 102-16 and bootstrapping capacitor 102-7 from a ONE to a binary ZERO (i.e., to the voltage VSS). At the same time, node capacitor 102-14 and bootstrapping capacitor 102-3 remain charged as a consequence of transistor 101-7 being held nonconductive. As soon as both the capacitor 102-16 and 102-7 discharge to a voltage level below the threshold voltages of transistors 102-2 and 102-8, these transistors switch from a conductive state to a nonconductive state. However, the output lines 102-10 and 102-12 still remain at a binary ZERO (i.e., at the voltage VSS), due to the conduction of transistors 102-4 and 102-6 since the clocking voltage $\overline{\phi 1}$ is normally a binary ZERO.

By contrast when the input signal Ao is a binary ZERO (i.e., 0 volts), node capacitor 101-5 is discharged to a binary ZERO by current source transistor 101-2. This renders transistor 101-6 nonconductive and transistor 101-7 conductive when transistor 101-10 is switched on by signal $\overline{\phi 1}$*. Therefore, node capacitor 102-14 and capacitor 102-3 are discharged from a binary ONE to a binary ZERO via conducting transistors 101-7 and 101-10 while node capacitor 102-14 and capacitor 102-7 remain charged negatively as a result of transistor 101-6 being held nonconductive. Accordingly, transistors 102-4 and 102-6 switch from a conductive to a nonconductive state.

At a predetermined time interval following the switching of clocking signal $\overline{\phi 1}$* to a binary ONE state, clocking signal $\overline{\phi 1}$ is forced from a ZERO to a binary ONE state. This switches the voltage level applied to the drain electrodes of driver transistors 102-4 and 102-8 from the positive voltage level, VSS, to the negative voltage level, VDD.

The state of the node capacitors 102-16 and 102-14 will have established which one of the pairs of driver transistors are to remain conductive and which one of the lines 102-10 and 102-12 switches state. For example, when the input address signal Ao is a binary ONE, it is seen that negatively charged node capacitor 102-14 and capacitor 102-3 cause only transistors 102-4 and 102-6 to remain conductive switching line 102-10 from a binary ZERO (i.e., voltage VSS) to a binary ONE (i.e., to the voltage VDD) when signal $\overline{\phi 1}$ switches to a ONE. Conversely, when the input address signal A*o* is in a binary ZERO state, it is seen that node capacitor 102-16 and capacitor 102-7 remain charged negatively which causes only transistors 102-2 and 102-8 to remain conductive switching line 102-12 from a binary ZERO to a binary ONE when signal $\overline{\phi 1}$ switches to a ONE.

During the switching of state of one of the lines 102-10 and 102-12 in accordance with the state of the input address signal Ao, bootstrapping capcitors 102-3 and 102-7 are arranged to enhance the switching speed of the driver transistors 102-4 and 102-8 when the clocking signal $\overline{\phi 1}$ is forced to a binary ONE. In greater detail, each of the capacitors 102-3 and 102-7 "feed back" to the gate electrode of their respective output transistors 102-4 and 102-8 the voltage level to which they were previously charged when clocking signal $\overline{\phi 1}$ is forced from a binary ZERO to a binary ONE. Accordingly, when the output voltage applied to either line 102-10 or 102-12 is forced from the positive voltage VSS to a negative voltage corresponding to that of signal $\overline{\phi 1}$, this change in voltage level is feed back through the capacitors to the gate electrode. As a result, the gate control electrode of the conducting one of the driver transistors 102-4 and 102-8 becomes more negative thereby increasing the conduction of this transistor such that the resultant output levels applied to a corresponding one of the lines 102-10 and 102-12 approximate the voltage level corresponding to clocking signal $\phi$1 (i.e., −10 volts).

If the bootstrapping capacitors were not used, the output voltage levels applied to lines 102-10 and 102-12 could reach a negative value of the level of clocking signal $\overline{\phi 1}$ plus the threshold voltage drop of the output transistors 102-4 and 102-8. This places the negative voltage levels applied to one of the lines 102-10 and 102-12 one threshold drop below that of the voltage level of clocking signal $\overline{\phi 1}$.

Since the driver circuits have values of effective electrode capacitance corresponding to the capacitances of capacitors 102-14 and 102-16, the values for bootstrapping capacitors 102-3 and 102-7 are selected so that the charge distribution on these capacitors will provide the desired increase in voltage at the gate electrodes of the transistors 102-4 and 102-8. It will be appreciated that the selection can be made empirically or calculated mathematically if the other values within the circuit are known. It will be noted that when the value of the node capacitors and bootstrapping capacitors are equal, the charge will be equally distributed between the two. Changes in these values can be made so as to select the desired distribution of voltages so as to provide an output voltage which equals that of clocking signal $\overline{\phi 1}$. In the preferred embodiment, the capacitors 102-3 and 102-7 of FIGS. 1a have approximately the same values of capacitance.

As concerns the construction of the buffer circuit 100 in accordance with this invention, it will be appreciated that the bootstrapping capacitors can be constructed at the same time the MOS transistors are constructed. For example, when the control electrode for the MOS transistor is formed, the metal section used to form the control electrode may be increased in size and used as one side of a capacitive plate. Similarly, the structure of the source electrode of the MOS transistor is increased in size and used on the other plate of the capacitor. Accordingly, these capacitors become an integral part of the control and source electrode structures. Of course, other known methods of integrating the capacitor into the structure of the MOS transistors may also be used with satisfactory results.

SYSTEM OPERATION

The operation of the address and selection apparatus and buffer circuits of the present invention in the memory chip of FIG. 1 with reference to FIGS. 1*a*, 1*b* and 2 will now be described. It is assumed by way of example that the memory cell whose location is defined by lines X*o* and Y*o* is selected by the combination of address signals A*o* through A10 to have its contents read out and new contents written into the cell during a write cycle of operation. Since the specific operations relating to reading information from the memory and writing information into the memory is not pertinent to the present invention, such operations will only be described to the extent necessary for a complete understanding and appreciation of the advantages of the present invention.

Figure 2:
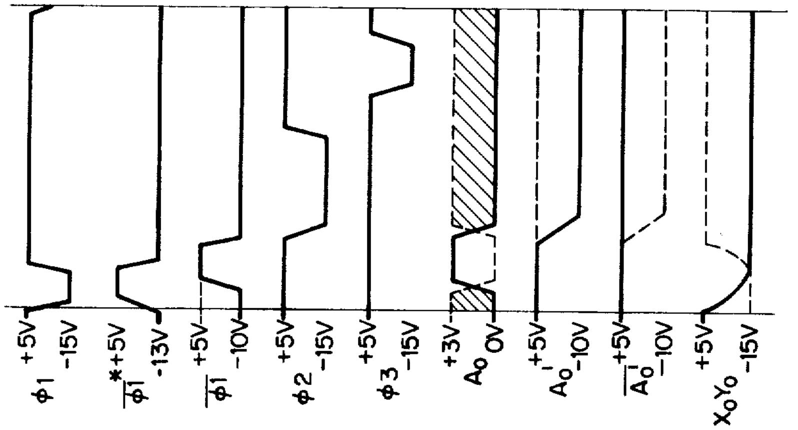

From FIG. 2, it will be seen that during each memory cycle there occurs three clocking signals $\phi$1, $\phi$2 and $\phi$3 which establish the time during which certain operations are to be performed during the memory cycle. Specifically, during the interval defined by clocking signal $\phi$1, the node capacitors 102-16 and 102-14 and the bootstrapping capacitors 102-3 and 102-7 of each of the buffer circuits of FIG. 1 are charged to a negative voltage, which switches all of the driver transistors into conduction placing the output signals Ao', $\overline{\text{Ao}}'$, to A10', $\overline{\textbf{A10}}'$ and CS', $\overline{\text{CS}}'$ of FIG. 1 at a binary ZERO corresponding to the voltage VSS (+5 volts). At the same time, the storage node capacitor corresponding to capacitor 101-5 of each buffer circuit is conditionally charged in accordance with the state of the low level input signal.

During the time interval $\phi$1, the capacitance of each of the lines which connect the input terminals of the X and Y decoder circuits to each of the buffer circuits 100-1 through 100-11 is discharged to approximately the voltage VSS. Also during this interval, the capacitances associated with each of the selection lines Xo through X31 and lines Y*o* through Y15, represented by capacitors Cx and Cy respectively are charged to a negative voltage representative of a binary ONE. Specifically, with every one of the address signals Ao', $\overline{\text{Ao}}'$ through A10', $\overline{\textbf{A10}}'$ binary ZEROS, the input transistors of each of the X and Y address decoder circuits 20 and 30 are nonconductive. Accordingly, when clocking signal $\phi$1 is forced to a ONE, this conditions the output transistor (e.g. transistor 20-1*g*) of each of the X decoder circuits and the output transistors (e.g. transistors 30-1*g* and 30-1*f*) of each of the Y decoder circuits to charge their respective node and line capacitances corresponding to capacitors 20-1*h*, 30-1*h*, C*x*, and Cy to binary ONES. The Y decoder circuits also charge to binary ONES the bootstrapping capacitors corresponding to capacitors C1 and C2 of their respective circuits 70-1 through 70-15. Also, the digit/sense capacitance represented by capacitor Cs in FIG. 1 of each of the lines D/S1 through D/S31 is precharged via a corresponding one of transistors 40-1 through 40-31 during the interval defined by clocking signal $\phi$1.

It will be noted from FIG. 2 that immediately following the termination of clocking signal $\phi$1 (i.e., when $\phi$1 is forced from a binary ONE to a binary ZERO), clocking signal $\overline{\phi 1}$* is forced to a binary ONE which conditions each of the buffer circuits 100-1 through 100-10 in accordance with the previous sampled state of corresponding ones of the address signals A*o* through A10 and the select signal $\overline{\text{CS}}$ to selectively discharge one of the node capacitances 102-14 and 102-16 and corresponding bootstrapping capacitors 102-3 and 102-7. When the Input Logic section 101 of each of the buffer circuits 100 has discharged the precharged node and bootstrapping capacitors in accordance with the sampled state of the applied input address and select signals, an appropriate one of the driver transistors within each pair will have been rendered nonconductive. The unshaded portion of address signal Ao in FIG. 2 indicates the period of time during which the input signal applied to the buffer circuit 100 is required to remain in the same state for proper sampling and discharging of the node and bootstrapping capacitors by the input Logic Section 101.

As seen form FIG. 2, after a predetermined delay sufficient for discharging the buffer circuit capacitor, the clocking signal $\overline{\phi 1}$ is then forced from a binary ZERO to a binary ONE. This clocking signal is applied to the upper transistors (i.e., transistors 102-4 and 102-8) of driver section of each of the buffer circuits 100 at precisely the same time. Accordingly, only one of the lines from each of the buffer circuits 100 is forced from a binary ZERO to a binary ONE by the conducting of one of the upper transistors of the pair of transistors 102-5 and 102-1 selected to conduct in accordance with the sampling of the input signal applied thereto. The other line of each of the buffer circuits remains in the binary ZERO state.

In this particular example, as shown by FIG. 2, since the low level input address signal Ao is a binary ZERO (i.e., 0 volts), the buffer circuit 100-1 causes the high level output address signal A*o'* to switch from a ZERO to a ONE and high level output signal $\overline{Ao'}$ to remain a ZERO. Thus, it is seen that the buffer circuit 100-1 translates the low level input signal representative of a ZERO into a pair of high level output signals of −10 volts and +5 volts representative of a binary ONE and binary ZERO respectively. Of course, it will be appreciated that by assigning the designations of A*o'* and $\overline{Ao'}$ in an opposite fashion, the buffer circuit 100-1 can be viewed as translating input voltage levels of zero volts and 3 volts respectively into voltage levels of −10 volts and +5 volts.

At the negative going edge of clocking signal $\overline{\phi 1}$, the address buffer circuits 100 apply the resultant different combinations of high level pairs of complementary address signals to the X address decoder circuits 20 and Y address decoder circuits 30. These signals enable only the "selected" row and column decoder gates, corresponding in the example to gates 20-1 and 30-1 respectively, to apply voltage binary ONES to lines X*o* and Y*o*. All remaining row and column decoder circuits are conditioned to switch their respective selection lines from a binary ONE to a binary ZERO.

Considering the above in greater detail, it will be noted that when any one of the address signals in FIG. 1 as for example A*o'* is forced to a binary ONE by its associated buffer circuit, it switches each of the input transistors of the X and Y decoder circuits 20 and 30 coupled to receive the signal into conduction discharging rapidly the capacitances C*x* and C*y* of each of the decoder select lines to binary ZEROS. In this example, all select lines except X*o*, Yo are forced to binary ZEROS. This in turn renders corresponding ones of the transistors 60-1 through 60-31 and transistor circuits 70-1 through 70-15 nonconductive. However, those "selected" decoder circuits whose input address signals are binary ZEROS (i.e., circuits 20-1 and 30-1) remain nonconductive which maintains both lines Xo and Yo at binary ONES. Accordingly, the transistor 60-1 and transistor circuit 70-1 are rendered conductive. This arrangement enhances the overall response of the selection apparatus in that the buffer circuits 100-1 through 100-11 maintain the "selected" lines in their initial charged state and rapidly discharge the remaining unselected lines to an unselected state (i.e., to a binary ZERO). Since it is assumed that the chip of FIG. 1 is selected to perform a write operation, the chip select buffer circuit 100-12 is also operative to switch only one of its output lines from a binary ZERO to a binary ONE in accordance with the state of select signal $\overline{CS}$ so as to enable both the write circuit 52 and the read circuit 92 for operation.

From FIG. 2, it will be noted that the memory cell 10 which is positioned at the intersection of a selected row and column line is conditioned by the application of clocking signals $\phi 2$ and $\phi 3$ respectively. This causes the cell to have its contents read out and thereafter restored during the read cycle of operation. Briefly, the read transistor (R) of the selected cell 10 is conditioned, upon the application of clocking signal $\phi 2$ via one of the transistors of circuit 70-1 to bus **80-1*b*, to place on the line D/S1 a signal representative of the bit content of the cell. This signal is then applied to line 85 by way of the transistor 60-1 and then to the input of read buffer circuit 90. The read buffer 90 applies the signal to the read circuit 92 which may then be operative to invert the signal in a conventional manner and apply it via a line DATA OUT to a utilization device. During the same cycle, the input signal applied to the line DATA IN is applied to the line D/S1 via write circuit 52 and write buffer circuit 50 during the interval defined by clocking signal $\phi 3$ for writing into the selected cell 10 when the write transistor (W) of the cell is switched on by clocking signal $\phi 3$.**

From the foregoing, it will be noted that all of the buffer circuits are responsive to initiate a change in state in a predetermined one of its out-put signals at the same time. Therefore, all changes of state in the address signals occur at precisely the same instant of time under the control of a single clocking signal. Further, since in the instance of each buffer circuit only one output signal has its state switched, this obviates any possibility of having a difference in delay between the occurrence of the output signals of each buffer circuit and prevents multiple selection.

It will also be appreciated that the use of clocking signals in the processing of address signals by the buffer circuits, minimizes power dissipation of the circuits in that each of the driver circuits 102-1 and 102-5 only dissipate power during the time interval defined by clocking singal $\phi 1$. That is, it is only during the presence of clocking signal $\phi 1$ that the current is supplied by the supply voltage source VDD through the transistors of the buffer circuits. Accordingly, the buffer circuits dissipate less power thereby enhancing their use in a semiconductor memory system.

It will be appreciated by those skilled in the are that many changes may be made to the illustrated embodiment without departing from the spirit and scope of the invention. For example, although certain types of MOS transistors and configurations have been disclosed, other types of MOS transistors and supply voltages may be used. Also, different voltages for the low level input signals and high level output signals may be assigned to represent binary ONE and binary ZERO states.

While in accordance with the provisions and statutes there has been illustrated and described the best form of the invention known, certain changes may be made to the apparatus described without departing from the spirit of the invention as set forth in the appended claims and that in some cases certain features of the invention may be used to advantage without a corresponding use of other features.

Having described the invention, what is claimed as new and novel is:

1. A MOS buffer circuit connected between an input terminal and first and second output terminals, said circuit comprising:

input gating means connected to said input terminal for receiving a low level input signal;

output driver means coupled to said first and second output terminals and to said input gating means; and, circuit means coupled to said input gating means and to said output driver means, said circuit means including first means for applying a first timing signal to initially condition said input gating means for sampling and storing a signal representative of the state of said input signal, said circuit means being operative to condition said output driver means so as to apply high level voltage signals of a first predetermined state to said pair of output terminals for the duration of said first timing signal, said circuit means further including second means for applying a second timing signal to said gating means, said gating means being responsive to said second timing signal to condition said output driver means in accordance with said stored signal and said input signal for enabling said driver means for switching a predetermined one of said output terminals from said first predetermined state to a second predetermined state and said circuit means including third means for applying a third timing signal to said driver means, said driver means being operative in response to said third timing signal to switch said predetermined one of said output terminals to said second predetermined state to provide a pair of complementary high level signals.

2. A buffer circuit for use in a semiconductor memory system connected between an input terminal and first and second output terminals, said circuit comprising:

input gating means connected to said input terminal for receiving a low level binary signal, said gating means including first field effect transistor means and second field effect transistor means, each of said transistor means being connected to receive said low level signal and said gating means including means coupled to said first and second transistor means for receiving a predetermined clocking signal;

output driver means including:

a first pair of series connected field effect transistor switching means connected to said first output terminal;

first capacitor means connected between an input of one of said transistor switching means and said first output terminal;

a second pair of series connected field effect transistor switching means connected to said second output terminal;

second capacitor means connected between the input of a corresponding one of said transistor switching means and said second output terminal;

circuit means connected to said inputs of said first and second pairs of switching means and to said first and second field effect transistor means, said circuit means being responsive to a first clocking signal voltage during a first interval to charge conditionally the capacitance associated with said second field effect transistor means to store a signal in accordance with the state of said low level input signal and to charge said first and second capacitor means to a predetermined voltage, said pairs of transistor means being conditioned by said predetermined voltage to switch into conduction to force said first and second output terminals to a first voltage level; and, said means of said gating means being responsive to said predetermined clocking signal to condition one of said first and second field effect transistor means to switch into conduction in accordance with said signal stored by said capacitance and low level signal discharging one of said first and second capacitor means to a second predetermined voltage, one of said transistor means in each pair being conditioned by said second predetermined voltage to switch to a nonconductive state, and a predetermined one of said transistor means of said first and second pairs in a conductive state being operative in response to a second clocking signal to switch said one of said output terminals from said first voltage level to said second voltage level.

3. In a MOS memory system comprising a plurality of MOS memory cells arranged in an array so as to connect in rows and columns, a plurality of X and Y selection lines, each coupled to different rows and columns of groups of said plurality of memory cells, a plurality of X and Y decoder circuits, each having a plurality of input terminals and an output terminal, each said output terminal of each of said X decoder circuits being coupled to a different one of said X selection lines and each said output terminal of said Y decoder circuits being coupled to a corresponding one of said Y selection lines, said system further including:

a plurality of address input lines, said lines each being coupled to receive a different one of a plurality of low level digital address signals representative of a corresponding number of address information digits applied to said address input lines; and a corresponding number of input buffer circuits for generating pairs of complementary address signals, each of said buffer circuits having an input terminal being coupled to a different one of said address lines and a pair of output terminals coupled to at least one input terminal of a different one of said plurality of X and Y decoder circuits and each of said buffer circuits including:

an input gating means coupled to said input terminal for receiving one low level signal;

output driver means coupled to said pair of output terminals; and, circuit means coupled to said input buffer circuits for applying a predetermined sequence of timing signals thereto, said circuit means including first means for applying a first timing signal to said input gating means and to said output driver means, said input gating means of each of said buffer circuits being operative in response to said first signal to store a voltage representative of the state of said low level address signal applied to each said input terminal and each said output driver means being operative in response to said first timing signal to apply high level voltage signals of a first predetermined state to said pair of output terminals for the duration of said first timing signal, said circuit means further including second means for applying a second timing signal to said gating means of each of said buffer circuits, each said input gating means being responsive to said second timing signal to condition selectively said output driver means associated therewith in accordance with said voltage to enable one of said output terminals to be switched from said first predetermined state to a second predetermined state and said circuit means including third means for applying a third timing signal to said driver means of each of said buffer circuits, each said driver means being responsive to said third timing signal from said circuit means to switch said one of said output terminals to said second predetermined state to provide a different one of said pairs of complementary high level address signals.

4. In the system of claim 3 wherein said system further includes:

circuit means being connected to apply said first timing signal to each of said plurality of X and Y decoder circuits;

each of said decoder circuits being conditioned by said first predetermined state of said buffer circuit output terminals applied to said decoder circuit input terminals to respond to said first timing signal by charging each of said X and Y selection lines to said second predetermined state; and, each of said decoder circuits being responsive to a switching of one of said input terminals from said first predetermined state to said second predetermined state to switch a corresponding one of said selection lines from said second predetermined state to said first predetermined state whereby only the X and Y selection line designated by said address signals remains in said second predetermined state.

5. In the system of claim 4 wherein the voltage levels corresponding to said first predetermined state and said second predetermined state are selected to be representative of a binary ZERO and a binary ONE respectively to enhance the response time of said X and Y decoder circuits by discharging all of said decoder circuits except the X and Y decoder circuits of said X and Y designated by said address signals.

6. In the system of claim 3 wherein said circuit means further includes means for applying to said second and third means respectively said second and third timing signals timed to overlap one another.

7. In the system of claim 3 wherein said circuit means includes timing means having an input terminal coupled to said first means and first and second output terminals coupled to said second and third means respectively, said timing means comprising:

transistor inverter switching means having gate, source and drain electrodes, said gate electrode being connected to said input terminal to receive said first timing signal, said source electrode being connected to a first reference voltage and said drain electrode being connected to a second reference voltage and to said first output terminal;

first transistor output driver means having gate, source and drain electrodes, said gate electrode being connected to said first output terminal, said source electrode being connected to said second output terminal and said drain electrode being connected to said second reference voltage;

second transistor output driver means having gate, source and drain electrodes, said gate electrode being connected to said input terminal, said source electrode being connected to said first reference voltage and said drain electrode being connected to said second output terminal; and, capacitor means connected between said gate electrode of said first transistor driver means and a reference potential so as to delay by a predetermined amount the switching of said first transistor output driver means in response to said first timing signal to produce said second and third timing signals at said first and second terminals respectively inverted with respect to said first timing signal and overlapping in time to one another by said predetermined amount.

8. In the system of claim 7 wherein said transistor switching means, said first transistor output driver means and said second transistor out-put driver means each include P channel field effect transistors and said capacitor means includes a discrete capacitor.

9. In the memory system of claim 3 wherein each said input gating means has an input terminal and a plurality of output terminals and includes:

a clocked transistor current source being connected to receive said second timing signal;

a first transistor switching device having gate, source and drain electrodes, said gate electrode being connected to said input terminal, said source electrode being connected to said clocked current source and said drain electrode being connected to said first means and to said output driver means;

a second transistor switching device having gate, source and drain electrodes, said gate and drain electrodes being connected to said first means;

capacitance means connected between a reference potential and said gate electrode of said second switching device;

transistor switching means connected between said gate electrode of said second switching device and said input terminal;

said circuit means including transistor means connected to said first means, said transistor means being operative in response to said first timing signal to charge said capacitance means during a first interval to a predetermined state, said transistor switching means being arranged to discharge selectively said capacitance means in accordance with the state of said input address signal thereby resulting in the storage of a voltage representative of said state on said capacitance means; and, said first and second transistor switching devices being selectively switched into conduction by said address signal and said stored signal respectively to switch into conduction upon being conditioned by said clocked current source in response to said second clocking signal, said first and second transistor switching device conditioning said output driver means to enable one of said buffer output terminals to be switched to said second predetermined state.

10. In the memory system of claim 9 wherein the gain of said transistor switching means selected to be is substantially greater than the gain of said transistor means.

11. In the memory system of claim 9 wherein each of said output driver means includes:

first and second driver switching means, each of said driver switching means including:

a first transistor switching device, said device having gate and source and drain electrodes, said source electrode being connected to said one of said output terminals and said drain electrode being connected to said circuit means;

capacitor means connected between said gate and source electrodes of said first switching device;

a second switching device, said device having gate and source and drain electrodes, said drain electrode being connected to said one of said output terminals, said source electrode being connected to a reference voltage;

capacitance means connected to said gate electrode of said second switching device; and wherein each said buffer circuit includes means interconnecting said gate electrode of said first switching device of each of said first driver switching means to a predetermined one of said input gating output terminals in common with said gate electrode of said second switching device of said second driver switching means, a selected one of said first and second switching devices of said first and second switching means being switched from a conductive state to a nonconductive state in accordance with said state of said address signal to the conductive one of said first switching devices being conditioned by a predetermined voltage level of said third timing signal at the termination of said first timing interval to switch one of said output terminals to said second predetermined state.

12. In the system of claim 9 wherein said clocked current source includes:

a switching device having gate, source and drain electrodes, said gate electrode being connected to receive said second timing signal, said source electrode being connected to a reference voltage and said drain electrode being connected to said source electrodes of said first and second switching devices, said device being conditioned to conduct in response to said second timing signal to supply current to said first and second switching devices.

13. In the system of claim 9 wherein said switching means includes:

a switching device having gate, source and drain electrodes, said gate electrode being connected to said input terminal, said source electrode being connected to said reference voltage and said drain electrode being connected to said gate electrode of said second switching device; and, said switching device being conditioned to discharge conditionally said capacitance means to said reference voltage in accordance with the state of said address signal applied to said input terminal during an interval defined by said first timing signal.

14. In the system of claim 9 wherein said first and second switching devices are insulated gate field effect transistors.

15. In the system of claim 14 wherein said field effect transistors are P channel enhancement type transistors.

16. In the system of claim 12 wherein said switching device is an insulated gate field effect transistor.

17. In the system of claim 15 wherein said field effect transistors are P channel enhancement type transistors.

18. In the system of claim 11 wherein said capacitor means of each of said driver switching means is a discrete capacitor whose value is selected relative to said capacitance means of the other of said driver switching means to condition the conductive one of said first transistor switching devices of said driver means to produce an output signal at said output terminal which approximates in magnitude the voltage of said third timing signal.

19. In the system of claim 11 wherein said capacitance means of said second switching device of each of said driver switching means includes the intrinsic capacitance of said gate electrode of second transistor switching device.

20. A MOS buffer circuit connected between an input terminal and a pair of output terminals for translating a low level input signal applied to said input terminal into a pair of complementary high level signals applied to said output terminals, said buffer circuit comprising:

an input logic means including:

a clocked transistor current source connected to receive a first predetermined clocking signal;

a first active switching device having a control electrode, a pair output electrodes, said control electrode being connected to said input terminal;

a second active switching device having a control electrode and pair of output electrodes, one of said output electrodes of each of said first and second active devices being connected in common to said clocked current source;

node capacitor means connected between a reference voltage and said control electrode of said second active switching device; and, transistor current source means connected to said input terminal and to said control electrode of said second switching device;

an output driver means including:

first and second driver switching means, each of said driver switching means including; first and second series connected switching devices, each device having a control electrode and a pair of output electrodes, and capacitor means, said capacitor means being connected between said control electrode and one of said output electrodes of said first device, the other output electrode of said first device of each driver switching means being connected to receive a second predetermined clocking signal, one of said output electrodes of said each second switching device of said first and second driver switching means being connected to a different one of said output terminals in common with said one of said output electrodes of said first device, the other of said output electrodes of each said second switching device being connected to a first reference voltage, and said control electrodes of said first device of each of said driver switching means and said second device of the other of said driver switching means being connected in common to the other one of said output electrodes of a different one of said switching devices of said logic means; and, precharge circuit means being responsive to a first clocking signal to charge said capacitor means of said first and second driver switching means to a first predetermined voltage, said first and second switching devices of each of said driver means being conditioned by said predetermined voltage to switch into conduction to apply a first predetermined high level voltage to each of said output terminals during a first interval defined by said first clocking signal;

said precharge circuit means including transistor means operative in response to said first clocking signal to charge said capacitor means of said second switching device of said input logic means to a second predetermined voltage and said current source being operative to discharge selectively said capacitor means from said second predetermined voltage in accordance with the state of said input signal to a voltage representative of said input signal;

said first and second active switching devices of said input gating means being selectively conditioned by said low level input signal and said voltage to be switched into conduction by said clocked current source in response to said first predetermined clocking signal for discharging selectively from said first predetermined voltage one of said capacitor means of one of said driver switching means in accordance with the state of said input signal, said first predetermined voltage of the other capacitor means conditioning one of said first switching devices and one of said second switching devices to remain conductive, said one of said first switching devices in response to said second predetermined clocking signal being operative to switch one of said output terminals from said first predetermined high voltage level to a second predetermined high voltage level at the termination of said first interval.

21. The buffer circuit of claim 20 wherein said transistor current source means includes:

a field effect transistor having a control electrode and first and second output electrodes, said gate electrode being connected to said input terminal one of said output electrodes being connected to said first reference voltage and the other of said output electrodes being connected to said control electrode of said second switching device;

and wherein said transistor means of said precharge circuit means includes:

a field effect transistor having a control electrode and first and second output electrodes, said control electrode being connected to receive said first clocking signal, one of said output electrodes being connected to a second reference voltage and the other of said output electrodes being connected to said control electrode of said input gating second active-switching device; and, said field effect transistor of said current source means being selected to have a gain substantially greater than the gain of said field effect transistor of said precharge circuit to discharge selectively said capacitor means to said first reference voltage in accordance with the state of said low level input signal during the time interval of said first clocking signal.

22. The buffer circuit of claim 20 further including:

timing means having an input terminal connected to receive said first clocking signal and first and second output terminals, said timing means being responsive to said first clocking signal to generate said first predetermined clocking signals at said first and second output terminals respectively inverted with respect to said first clocking signal, said timing means including means for delaying said second predetermined clocking signal being delayed by a predetermined amount relative to said first predetermined clocking signal to provide sufficient time for discharging said capacitor means of said driver switching means.

23. The buffer circuit of claim 20 wherein said capacitor means of each of said driver switching means includes:

a discrete capacitor having a value of capacitance relative to the effective capacitance associated with said control electrode of said first switching device for retaining enough voltage for driving said control electrode so that said second predetermined high voltage level approximates the voltage level of said second predetermined clocking signal.

24. The buffer circuit of claim 20 wherein said precharge circuit transistor means includes:

a first field effect transistor having a control electrode and first and second output electrodes, said control electrode being connected to receive said first clocking singal, said first output electrode being connected to a second reference voltage and said second output electrode being connected to said control electrode of said second active switching device; and, wherein said precharge circuit means further includes:

second and third field effect transistors, each having a control electrode and first and second output electrodes, said control electrode being connected to receive said first clocking signal, said first output electrode being connected to said second reference voltage and said second and third transistors being connected to said output electrode of said different one of said switching devices, said first, second and third transistors being responsive to said first clocking signal to charge said capacitor means of said control electrode of said second switching device of said input gating means, said capacitor means of said first device of said first driver switching means and said capacitor means of said first device of said second driver switching means respectively.

* * * * *

UNITED STATES PATENT OFFICE

CERTIFICATE OF CORRECTION

Patent No. 3,757,310 Dated September 4, 1973

Inventor(s) Brian F. Croxon

It is certified that error appears in the above-identified patent and that said Letters Patent are hereby corrected as shown below:

Column 18, line 10, delete "out-put" and insert --output--.

Column 18, line 53, after "means" insert --is--.

Column 18, line 53, after "to be", delete "is".

Column 19, line 16, delete "to".

Column 19, line 16, after "address signal" insert --,--.

Column 22, line 5, before "predetermined" insert --and second--.

Column 22, line 9, delete "being delayed".

Column 22, line 29, delete "singal" and insert --signal--.

Signed and sealed this 18th day of June 1974.

(SEAL)
Attest:

EDWARD M.FLETCHER,JR.
Attesting Officer

C. MARSHALL DANN
Commissioner of Patents